Patented May 26, 1931

1,807,067

UNITED STATES PATENT OFFICE

CHARLES R. MABEE, OF BUFFALO, NEW YORK, ASSIGNOR, BY MESNE ASSIGNMENTS, TO CHARLES H. DONALDSON, OF BUFFALO, NEW YORK

MANUFACTURE OF LIVE STOCK FEED

No Drawing. Application filed June 20, 1925. Serial No. 38,565.

This invention relates to the manufacture of live stock feeds and to compositions adapted for use in accordance therewith, and includes correlated improvements and discoveries whereby there may be produced a material having a high feeding value.

An object of the invention is to provide an improved process whereby farm roughage may readily and economically be converted into an appetizing, nourishing, and easily digested feeding material.

Another object is to provide a composition adapted for use in the manufacture of live stock feeds whereby the flavor, food value, and digestibility of farm roughage may be enhanced.

A further object is to provide a process whereby a composition of such nature may be formed.

Other objects of the invention will in part be obvious and will in part appear hereinafter.

The invention accordingly comprises the several steps and the relation and order of one or more of such steps with respect to each of the others thereof, and a composition of matter possessing the characteristics, properties and relation of constituents which will be hereinafter exemplified and the scope of the application of which will be indicated in the claims.

For a fuller understanding of the nature and objects of the invention, reference should be had to the following detailed description exemplifying the invention.

It is often desired to employ farm roughage as a live stock feed because of the relatively low cost thereof, and because of the health-giving constituents contained therein. The quantity of digestible nutrients in farm roughage, however, is, as a rule, comparatively small, and furthermore the sense of taste of domestic animals is so highly developed that they refuse to consume certain types of roughage such as roughage cut before and after the ripe period, which have a disagreeable flavor but which nevertheless have a nutritive value. Accordingly the present invention is directed to a treatment of farm roughage so as to increase the nutritive value thereof and to render the same palatable.

In order to facilitate the storage and transportation of the roughage when it is to be utilized either at a time or place removed from the time or place of production, and to prevent the decay of the materials and the development of fungoid growths, it is preferable to dry the roughage and to maintain the same in a dry state up to the time of treatment.

In the practice of the invention, a mass of roughage, composed, for example, of any of a number of farm products such as hay, straw, fodder, vines and stover, may be treated with a composition hereinafter referred to as a "converter," whereby the roughage may be converted into a feed possessing a high nutritive value, a ready assimilability, and a flavor having a particular appeal for domestic animals.

There may be included in the converter any of a number of substances whereby the feeding value of the roughage is increased, such, for example, as certain fermenting agents, flavoring agents and supplemental materials. The term "fermenting agent" as used herein is intended to include not only materials containing active ferments and generally referred to herein as "fermenters," but also materials whereby the activity of inherent and added ferments may be augmented and which will be referred to as "fermentation promoters".

Among the fermenters which may be employed are yeast, diastatic malt, materials containing lactic bacilli and fermented cereal products generally.

The fermentation promoters used may include material such as ground legumes and ground corn whereby the ferments inherent in the feed or added thereto may be incited to action, and various pulverized cereal products as ground rye and ground barley as well as certain mineral substances, for example, sodium chloride, calcium hydrate and phosphoric acid whereby the rapidity of the fermentation may be increased. As flavoring agents, mention may be made of benzaldehyde, lactic acid, sodium chloride and certain pulverized cereal products of which malt, yeast flour, wheat middlings, oil meal, ground rye, ground corn, ground barley, and ground oats are examples, whereby a palatable flavor is added to the roughage, obnoxious flavors overcome, and those natural flavors, which have a particular appeal to domestic animals, magnified. Of these materials benzaldehyde (the essential oil of bitter almonds) is particularly desirable since it not only magnifies various inherent or added flavors and counteracts unpleasant flavors and odors, giving the feed a uniform flavor which possesses a particular appeal for domestic animals; but also tends to prevent putrefaction.

There may, moreover, be added to the converter composition various supplemental materials such as ground bone meal, acid calcium phosphate, ground rock phospate and sulphur.

When it is desirable to "sweeten" feeds having an excessive acidity, or to promote the disintegration of the roughage and to render the protein content thereof more readily soluble, the converter may include calcium hydrate or a similar material. Furthermore, calcium hydrate may be used to react with calcium acid phosophate to produce the tertiary orthophosphate of calcium during treatment of the roughage.

When benzaldehyde is employed, it is desirable that the composition also include a vehicle therefor so that the composition may readily be transported and stored. Various materials may be used for this purpose, but it is preferable to employ such agents as those set forth above which will be active in the conversion of roughage or which are of value in the metabolism of domestic animals. Among the materials which have been found most suitable for use as vehicles are diastatic malt, yeast flour, sodium chloride, the hydrate of calcium or the phosphates of this metal, ground cereals, oil meal and bone meal. For the sake of convenience of terminology, materials of this nature may be termed "vehicle converter ingredients". The relative proportions of the benzaldehyde and the vehicle materials will, of course, depend upon the requirements in a particular case; but since a relatively small quantity of benzaldehyde is sufficient to give the desired flavor to the feed, and inasmuch as the benzaldehyde in a concentrated form has a pronounced antiseptic action, it is desirable that the quantity of benzaldehyde employed be sufficiently small when compared with the quantity of vehicle materials used so that the benzaldehyde will neither give too strong a flavor to the feed nor inhibit the action of the ferments inherent in the roughage or any ferments included in the converter.

One process whereby a converter including benzaldehyde may be formed is given below:

One part of benzaldehyde may be dissolved in 300 parts of water and the solution sprayed upon 2000 parts of a mixture of vehicle materials containing, for example, 15 parts of finely ground diastatic malt, 10 parts of comminuted cereal products such as ground rye, ground barley, ground corn, oil meal, and wheat middlings, 15 parts of calcium hydrate and 60 parts of sodium chloride. The materials may be thoroughly stirred during the admixing and may be dried thereafter to facilitate the storage and transportation thereof. Instead of water, either alcohol or ether may be used as a solvent for the benzaldehyde; for example, there may be formed a solution of 1 part of benzaldehyde in 1 or 2 parts of alcohol and the same incorporated in a mixture of vehicle materials, in which case it will be unnecessary to dry the resulting composition. Other materials may, of course, be introduced into the composition at any stage of the process outlined above.

In the preferred mode of operation for the treatment of dry farm roughage with the converter composition, the roughage may be moistened and comminuted by any suitable means as by a clipping, whereupon the comminuted roughage may be introduced into a suitable container. The converter composition, containing 15 parts standard diastatic malt, 15 parts hydrated lime, 10 parts sixteen per cent. calcium acid phosphate mixture and 60 parts sodium chloride in a finely ground condition, may be mixed with a fluid medium, such as water, in the proportions of one part by weight of converter to 120 parts of water, for example, and this admixture employed to moisten 80 parts of comminuted roughage. The roughage may be moistened with the admixture as it is introduced into the container or otherwise mixed therewith, as circumstances dictate. The moist mass may thereafter be subjected to either heat or pressure or to both, so as to encourage the reactions set up by the converter materials. After these reactions have progressed to a desired point, the treated roughage may be withdrawn from the container and used as a feed.

By means of a process such as outlined above, there may be produced a live-stock feed which is appetizing, digestible and relatively inexpensive, besides containing at least the major portion of those constituents of farm roughage which are of value in the metabolism of domestic animals.

It will be appreciated that the various materials above enumerated may be employed either singly or in combination or in conjunction with other materials of like or different nature and that various reactions between the materials employed in the converter composition may result in the formation of a composition having still other constituents. It will, moreover, be appreciated that since the precise reactions occurring during the treatment of the roughage are at present unknown, the various materials employed may perform functions other than those set forth above.

Furthermore, it may be mentioned that in the practice of the invention a continuous, semi-continuous, or batch process may be used.

While the term "converter" has been used herein to refer generally to a composition including certain of a number of materials which may be either agents which will be active in the conversion of the roughage or which are of value in the metabolism of domestic animals; it is to be understood that the term "conversion agent" as employed in the appended claims is intended to exclude fermenters and to include only such materials as assist in the reactions involved in the transformation of the roughage in some manner, such, for example, as accelerating the activity of the ferments inherent in the roughage and/or of added fermenters, controlling the reactions resulting from the fermentation, or setting up supplemental conversion reactions in the roughage.

Since certain changes in the above process and composition which embody the invention may be made without departing from the scope thereof, it is intended that all matter contained in the above description shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described my invention, what I claim as new and desire to secure by Letters Patent is:

1. In the art of producing an improved live stock feed from farm roughage by subjecting the roughage to fermentative activity, the process which includes conducting the fermentation in the presence of a conversion agent.

2. In the art of producing an improved live stock feed from farm roughage by subjecting the roughage to fermentative activity, the process which includes conducting the fermentation in the presence of a mineral conversion agent.

3. In the art of producing an improved live stock feed from farm roughage by subjecting the roughage to fermentative activity, the process which includes comminuting dry farm roughage, applying thereto an aqueous medium containing a mineral conversion agent and thereafter subjecting the roughage to fermentative activity in the presence of heat and/or pressure.

4. In the art of producing an improved live stock feed from farm roughage by subjecting the roughage to fermentative activity, the process which includes admixing a mineral fermentation promoter with the roughage and thereafter subjecting the roughage to fermentative activity.

5. In the art of producing an improved live stock feed from farm roughage by subjecting the roughage to fermentative activity, the process which includes admixing calcium hydrate, sodium chloride and calcium acid phosphate with the roughage and thereafter subjecting the roughage to fermentative activity.

6. A composition for use in the processing of farm roughage including calcium hydrate, sodium chloride, sulphur, a phosphate of calcium and malt.

7. In the art of producing an improved live stock feed by the fermentative conversion of farm roughage, the process which comprises moistening dry farm roughage, and subjecting the roughage to fermentative activity in the presence of a medium which beneficially influences the conversion of the roughage, said medium comprising an oxygen-containing compound of calcium.

8. In the art of producing an improved live stock feed by the fermentative conversion of farm roughage, the process which comprises moistening dry farm roughage, and subjecting the roughage to fermentative activity in the presence of a conversion agent having buffer properties whereby the development of excessive acidity is prevented.

9. In the art of producing an improved live stock feed by the fermentative conversion of farm roughage, the process which comprises moistening dry farm roughage, and subjecting the roughage to fermentative activity in the presence of a medium which beneficially influences the conversion of the roughage, said medium comprising hydrated lime.

10. In the art of producing an improved live stock feed by the fermentative conversion of farm roughage, the process which comprises moistening dry farm roughage and admixing therewith a composition containing malt, lime and common salt, and thereafter subjecting the roughage to fermentative activity.

11. A compound for converting fibrous materials containing food values comprising lime, salt, malt and sulphur.

12. In the art of producing an improved live stock feed by the fermentative conversion of farm roughage in a moist condition, the process which comprises subjecting the roughage to fermentative activity in the presence of a medium which beneficially influences the conversion of the roughage, said medium comprising calcium hydrate.

13. In the art of producing an improved live stock feed by the fermentative conversion of farm roughage in a moist condition, the process which comprises subjecting the roughage to fermentative activity in the presence of a medium which beneficially influences the conversion of the roughage containing calcium hydrate and sodium chloride.

14. In the art of producing an improved live stock feed by the fermentative conversion of farm roughage in a moist condition, the process which comprises subjecting the roughage to fermentative activity in the presence of a medium which beneficially influences the conversion of the roughage containing calcium hydrate, sodium chloride and sulphur.

In testimony whereof I affix my signature.

CHARLES R. MABEE.